United States Patent [19]

Kaneyasu

[11] Patent Number: 5,215,059

[45] Date of Patent: Jun. 1, 1993

[54] METHOD AND SYSTEM FOR REDUCING ENGINE KNOCK IN AN INTERNAL COMBUSTION ENGINE

[75] Inventor: Masayoshi Kaneyasu, Farmington Hills, Mich.

[73] Assignee: Hitachi America, Ltd., Research and Development Division, Tarrytown, N.Y.

[21] Appl. No.: 863,088

[22] Filed: Apr. 3, 1992

[51] Int. Cl.$^5$ ............................................... F02P 5/14
[52] U.S. Cl. ................................................... 123/425
[58] Field of Search ............... 123/425, 416, 417, 435; 364/431.08; 73/35

[56] References Cited

U.S. PATENT DOCUMENTS

| | | | |
|---|---|---|---|
| 4,116,173 | 9/1978 | McDougal et al. | 123/425 |
| 4,991,553 | 2/1991 | Kurihara et al. | 123/425 |
| 5,088,044 | 2/1992 | Matsuura | 364/431.08 |
| 5,090,382 | 2/1992 | Bolander et al. | 123/425 |
| 5,131,369 | 7/1992 | Kanahiro et al. | 123/425 |
| 5,131,370 | 7/1992 | Chikamatsu et al. | 123/425 |
| 5,133,322 | 7/1992 | McDougal et al. | 123/425 |
| 5,134,980 | 8/1992 | Sakakibara et al. | 123/425 |

OTHER PUBLICATIONS

SAE Document No. 890156.
SAE Document No. 891964.

Primary Examiner—Raymond A. Nelli
Attorney, Agent, or Firm—Gifford, Groh, Sprinkle, Patmore and Anderson

[57] ABSTRACT

A system for reducing knock in an internal combustion engine is disclosed and includes a vibration detector which detects engine vibration and generates an output signal representative of the magnitude of the engine vibration over a predetermined frequency spectrum. The vibration output signal multiplied by a first weight factor is integrated over a lower portion of the frequency spectrum to obtain a first value while the vibration signal multiplied by a second weight factor is integrated over a higher portion of the frequency spectrum to obtain a second value. The first value is compared with a first threshold value and, when the first value exceeds the first threshold, the system generates a fuel control output signal to increase the fuel supplied to the engine to reduce engine knock. Similarly, the second value is compared to a second threshold value and when the second value exceeds the second threshold value, the system generates a spark ignition control output signal to retard the engine spark ignition thereby reducing engine knock.

18 Claims, 8 Drawing Sheets

METHOD AND SYSTEM FOR REDUCING ENGINE KNOCK IN AN INTERNAL COMBUSTION ENGINE

BACKGROUND OF THE INVENTION

I. Field of the Invention

The Present invention relates generally to a method and system for reducing engine knock in an internal combustion engine.

II. Description of the Prior Art

High engine load and overheated engine cylinders are the primary causes of engine knock in internal combustion engines. When knock occurs in an internal combustion engine, vibrations composed of specific resonant frequencies occur. With reference to FIG. 1, the vibration spectrum produced by various types of engine knock is thereshown. The simplest type of engine knock is usually caused by a single self combustion resulting from an overheated combustion chamber. Such a condition causes a monotonous or single knock and thus produces a vibration peak at approximately 6 kHz as indicated by arrow 10.

The other resonant vibration modes are caused by more complex knock phenomena. One such complex knock phenomena occurs from simultaneous combustion at different cylinder portions beside the cylinder wall. This complex knock phenomena usually results from high engine loads and results in higher resonant vibration frequencies illustrated by the peaks 12-15 in FIG. 1.

Consequently, overheated combustion chambers create resonant frequency vibrations at a relatively low frequency while high engine load conditions result in engine knock at higher resonant vibration frequencies.

With reference then to FIG. 2, a graph 16 is thereshown illustrating the relation between combustion cylinder temperature and the combustion cylinder pressure for a typical internal combustion engine In the region 18 below the graph, normal or no knock operation of the engine occurs. Conversely, in the region 20 above the graph 16, engine knock occurs.

Still referring to FIG. 2, engine knock caused by a single self combustion resulting from an overheated combustion chamber will produce engine operation in the area indicated at arrow 22. The correction of such knock is most efficiently corrected by increasing the fuel flow to the engine cylinder thus reducing the temperature of the engine cylinder and moving the engine operation into the normal, no knock region 18 as indicated at arrow 23.

Conversely, multiple simultaneous knocks caused by high engine load will create a knocking condition in the region indicated by arrow 24. Such a knock is most efficiently corrected by retarding the spark ignition and moving the engine operation into the normal operation region 18 as shown by arrow 25.

Lastly, an engine operating condition having both single knocks and multiple cylinder knocks will create an engine operation in the area indicated by arrow 26. In such a situation, both an increase of the fuel supply to the engine, as well as retardation of the spark ignition is the most efficient way to reduce the engine knock and to restore engine operation into the normal operation region 18 as shown by arrow 27.

There have been previously known engine knock detectors and which vary the fuel supply and/or the spark ignition timing as a function of the engine vibration. These previously known engine knock detectors, however, only measure a single, fixed resonant frequency spectrum by utilizing a band pass filter. Consequently, these previously known knock detectors are incapable of differentiating between single knocks caused by overheated combustion chamber and multiple knocks caused by high load engine operation. Similarly, since these previously known systems utilize band pass filters to detect engine knock only within a relatively narrow frequency spectrum, engine vibration resulting from engine knock outside the band pass frequency spectrum remains undetected and, therefore, uncorrected.

For all of the foregoing reasons, the previously known engine knock detection systems are relatively inefficient and inadequate.

SUMMARY OF THE PRESENT INVENTION

The present invention provides an engine knock detection and correction system which overcomes all of the above mentioned disadvantages of the previously known systems.

In brief, the antiknock system of the present invention discloses a means for detecting engine vibration and for generating a vibration output signal representative of the magnitude of the engine vibration over a predetermined frequency spectrum. The vibration output signal multiplied by a first weight factor is then integrated over a lower portion of the frequency spectrum to obtain a first value. Similarly, the vibration output signal multiplied by a second weight factor is integrated over a higher portion of the frequency spectrum to obtain a second value. Consequently, the first value is representative of engine knock caused by a single knock in an overheated combustion chamber while the second value is representative of multiple knocks occurring from high engine loads.

The first knock value is then compared with a first threshold value and when the first value exceeds the first threshold, the system generates a fuel control output signal to increase the fuel supply to the internal combustion engine. Similarly, the second knock value is compared with a second threshold and, when the second value exceeds the second threshold, the system generates a spark ignition control signal to retard the spark ignition for the engine thus reducing or eliminating multiple knocks.

Consequently, by analyzing the frequency spectrum when multiplied by the appropriate weight factor, appropriate control signals are generated to the fuel control system and/or the spark ignition system for the engine in order to thereby most efficiently reduce the engine knock.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 3:
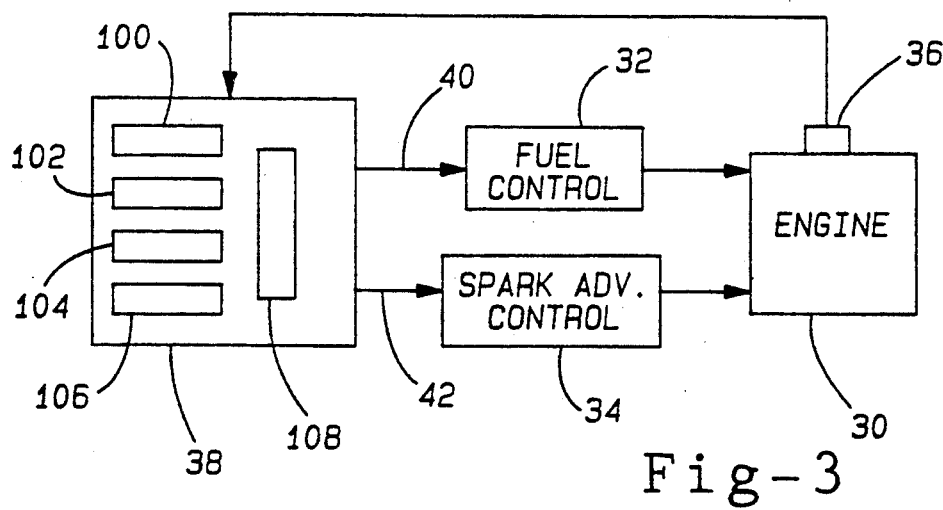
FIG. 3 is a block diagrammatic view illustrating a preferred embodiment of the present invention.

With reference first to FIG. 3, a block diagrammatic view of the anti knock system 38 of the present invention is thereshown for use with an internal combustion engine 30. A fuel control system 32 controls the fuel delivery rate to the engine 30 while a spark ignition control system 34 controls the spark ignition timing for the engine 30. The fuel control system 32 forms the means for varying the rate of fuel delivery by the fuel system as a function of a fuel control output signal, and the spark, ignition control system 34 forms the means for varying ignition timing of the spark ignition system as a function of a spark ignition control output signal. Both the fuel control system 32 and the spark ignition control system 34 may be of any conventional construction.

An engine vibration detector 36 is connected to the engine 30 and detects engine vibration over a predetermined frequency spectrum, such as 4-19 kHz. The vibration detector 36 forms the means for detecting engine vibration and for generating a vibration output signal representative of the magnitude of the engine vibration over a predetermined frequency spectrum. This detector 36 provides an output signal to the anti knock system 38 of the present invention In a manner which will be subsequently described in greater detail, the anti knock system 38 of the present invention provides control signals on outputs 40 and 42 to the fuel control system 32 and spark ignition system 34, respectively, to vary the fuel supply and spark ignition timing for the engine 30.

The antiknock system includes means 100 for integrating the vibration output signal over said frequency spectrum multiplied by a first weight factor to obtain a first value, means 102 for integrating said vibration output signal over frequency spectrum multiplied by a second weight factor to obtain a second value, wherein said first weight factor has a greater average value in a first frequency range of said frequency spectrum than said second weight factor while said second weight factor has a greater average value in a second frequency range of said frequency spectrum than said first weight factor, means 104 for comparing said first value with a first threshold value and generating a fuel control output signal when said first value exceeds said first threshold, and means 106 for comparing said second value with a second threshold value and generating a spark ignition control output signal when said second value exceeds said second threshold.

Figure 1:
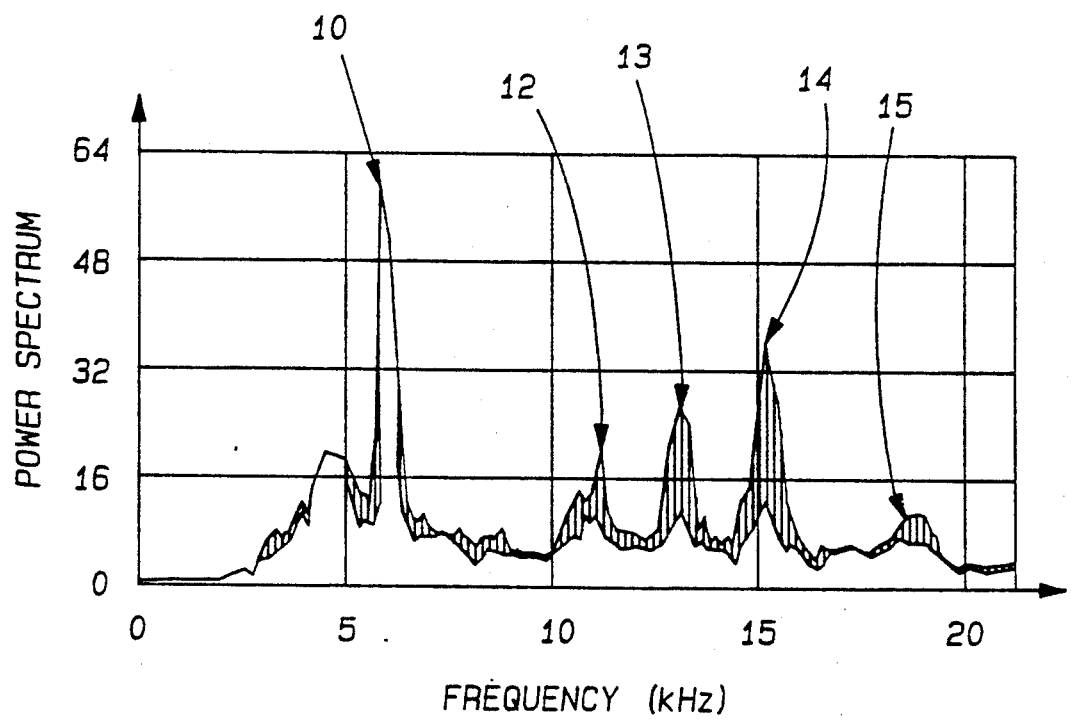
FIG. 1 is an exemplary frequency spectrum analysis of an internal combustion engine displaying both single knocks and multiple engine knocks.
Figure 2:
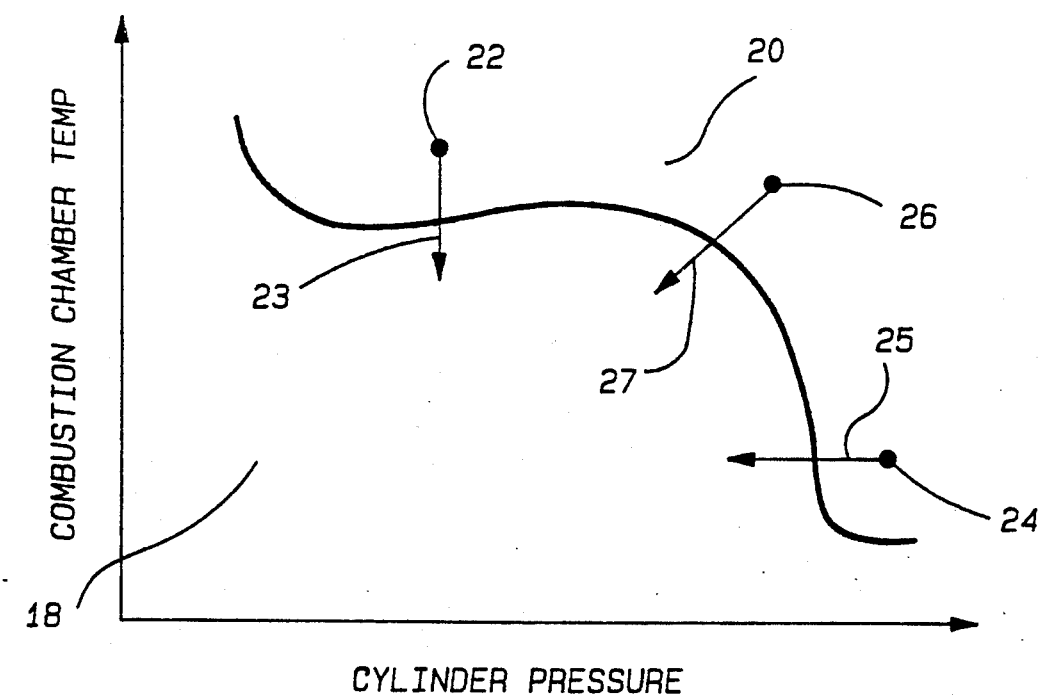
FIG. 2 is a graph of a typical engine operation differentiating an engine knock condition versus a normal, no knock engine condition.
Figure 4A:
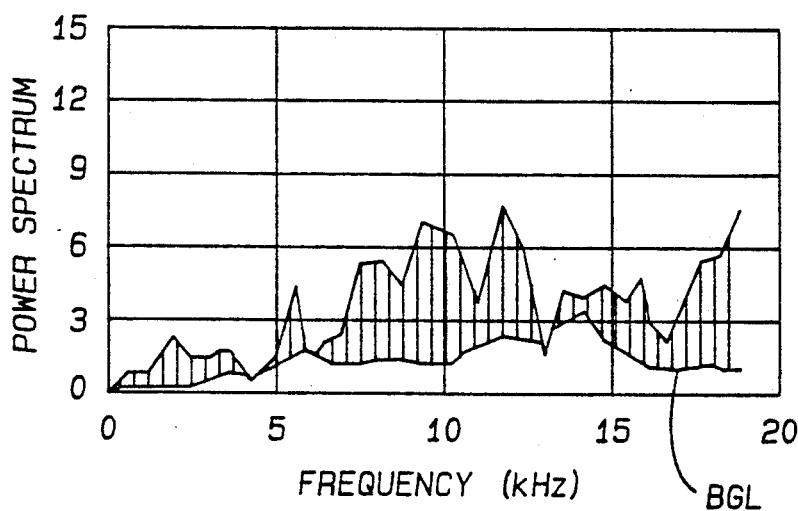
FIG. 4(a) is a frequency spectrum analysis of engine vibration resulting primarily from a single knock engine condition.
Figure 4B:
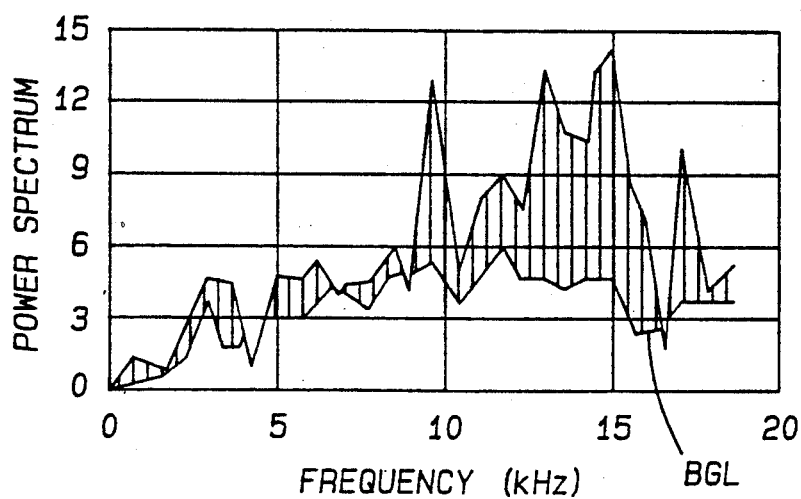
FIG. 4(b) is a view similar to FIG. 4(a) but illustrating an engine undergoing primarily a multiple knock engine operating condition.
Figure 7:
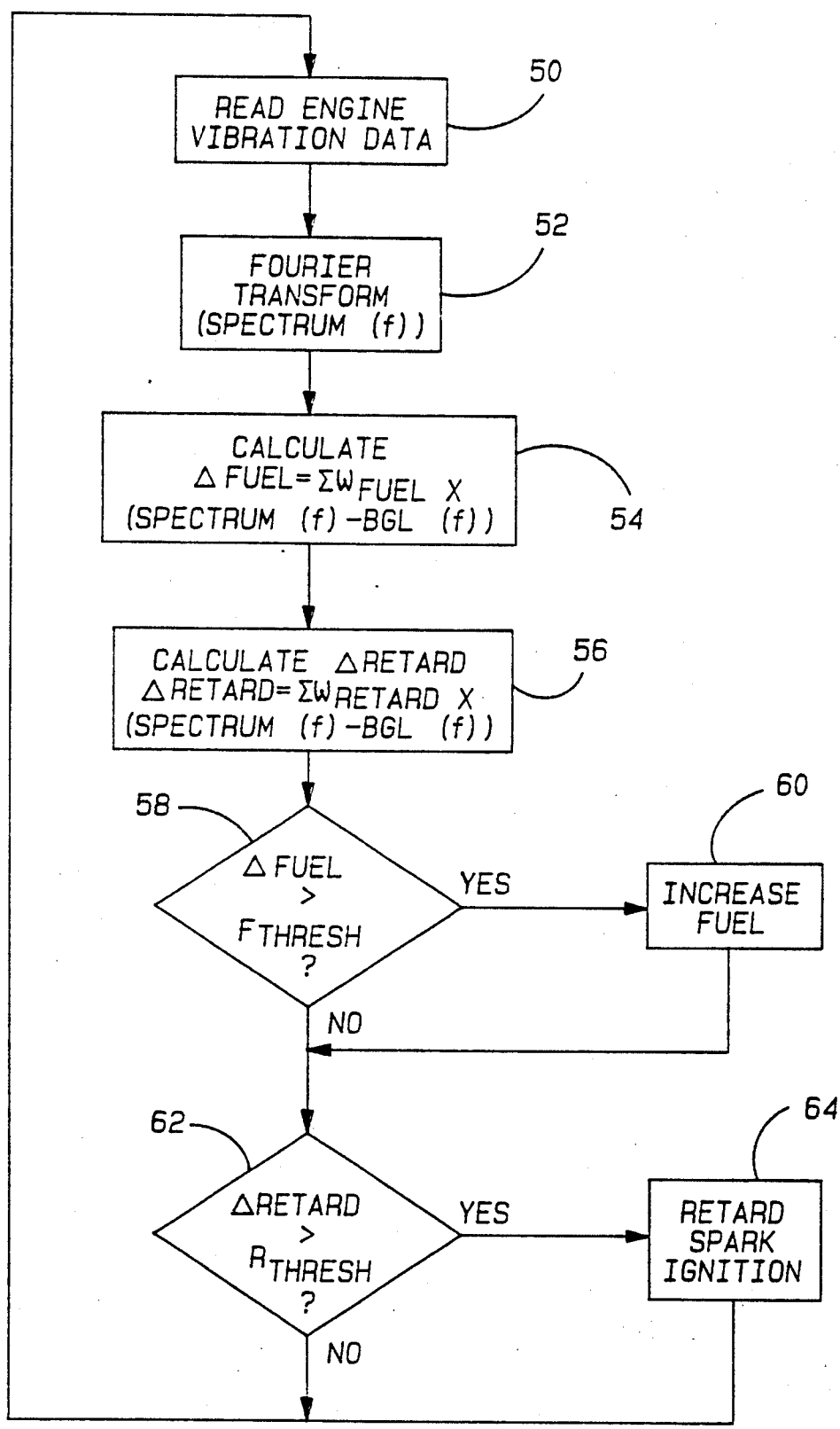
FIG. 7 is a flow chart illustrating the operation of the present invention.

With reference now to FIGS. 4(a) and 4(b), FIG. 4(b) depicts a typical frequency spectrum output of the engine vibration from the detector 36 during an engine operation condition undergoing multiple simultaneous engine knock. Similarly, FIG. 4(a) represents a typical frequency spectrum vibration output from the detector 36 of an internal combustion engine during the occurrence of singe engine knocks. A comparison of FIG. 4(a) and 4(b) reveals that, with respect to single engine knocks (4(a)) increased engine vibration occurs in the frequency range of approximately 5 kHz-13 kHz. Conversely, during the occurrence of multiple simultaneous knocks (FIG. 4(b)), an increase of engine vibration occurs at higher frequencies, i.e. frequencies in the range of 9 kHz-19 kHz. Furthermore, as previously discussed with respect to FIG. 2, the occurrence of single engine knocks (FIG. 4(a)) is most efficiently corrected by an increase of fuel supply to the engine while the occurrence of multiple simultaneous engine 1 knocks (FIG. 4(b)) is most efficiently corrected by retardation of the spark ignition. With reference then to FIG. 7, the antiknock system of the present invention analyzes the vibration frequency spectrum (FIGS. 4(a) or 4(b)) to determine the precise type of engine knock, i.e. single engine knock or multiple simultaneous engine knock or both, and then generates output signals which correct or eliminate the engine knock. More particularly, at step 50, the system of the present invention first acquires the engine vibration data from the vibration transducer 36 over the entire frequency spectrum, from 0-19 kHz. Step 50 then branches to step 52 in which the vibration spectrum is then analyzed using either discreet Fourier transforms or Walsh to Fourier transforms. Preferably, this is accomplished through a single chip microprocessor 108 although any conventional means can be used to analyze the frequency spectrum.

Figure 5:
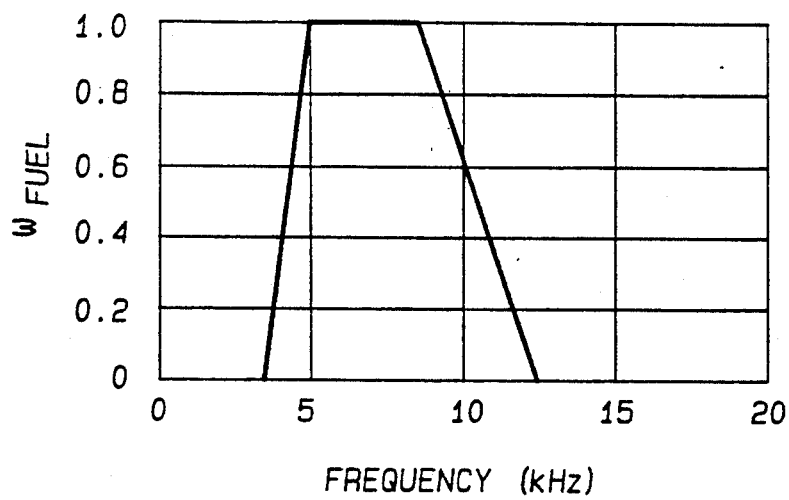
FIGS. 5 and 6 are graphs of weight factors used in conjunction with the preferred embodiment of the present invention.

Step 52 then branches to step 54 which calculates a Δ Fuel control signal utilizing the following formula:

$$\Delta Fuel = \Sigma W_{FUEL}(f) \times (SPECTRUM(f) - BGL(f))$$

where $W_{FUEL}$ is a weight factor which varies as a function of frequency (f) as depicted in FIG. 5;

SPECTRUM (f) is the magnitude of engine vibration over the frequency spectrum as depicted in FIGS. 4(a) and 4(b); and BGL is a background noise magnitude depicted in FIGS. 4(a) and 4(b) which varies as a function of frequency (f) and may be determined empirically for the particular engine.

Figure 6:
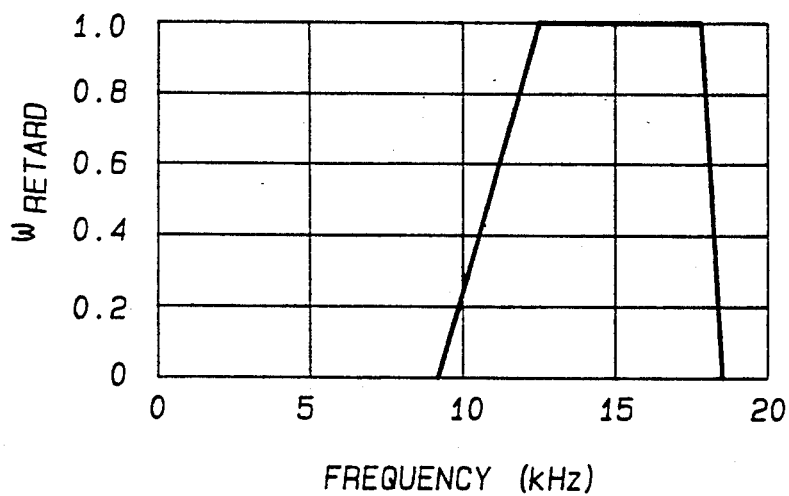

Step 54 (FIG. 7) then branches to step 56 in which the Δ Retard value is calculated in accordance with the following formula:

$$\Delta Retard = \Sigma W_{RETARD}(f) \times (SPECTRUM(f) - BGL(f))$$

where $W_{RETARD}$ is a weight factor which varies as a function of frequency (f) as depicted in FIG. 6;

SPECTRUM (f) is the magnitude of engine vibration over the frequency spectrum as depicted in FIGS. 4(a) and 4(b); and BGL is a background noise magnitude depicted in FIGS. 4(a) and 4(b) which varies as a function of frequency (f) and may be determined empirically for the particular engine.

A comparison of FIGS. 5 and 6 reveals that the weight factor ($W_{FUEL}$) is more heavily weighted in the lower frequency range, i.e. 5–13 kHz, of the entire frequency spectrum and thus more heavily weighted in the areas corresponding to a single engine knock. Similarly, the weight factor for the spark ignition retard ($W_{RETARD}$) is more heavily weighted in the higher frequencies, i.e. 9 kHz–19 kHz, which would correspond to multiple simultaneous engine knocks.

With reference again to FIG. 7, step 56 then branches to step 58 where the Δ Fuel value calculated at step 54 is compared to a threshold value ($F_{THRESHOLD}$). If the Δ Fuel exceeds the threshold value ($F_{THRESHOLD}$), step 58 branches to step 60 whereupon the anti-knock system 38 generates an output signal to the fuel control system 32 to increase the fuel delivery rate to the engine 30. Such a condition would be indicative of a single engine knock caused by excessive combustion cylinder temperature.

With reference still to FIG. 7, step 60 branches to step 62 or, alternatively, if the Δ Fuel value compared at step 58 is less than the $F_{THRESHOLD}$, step 58 branches directly to step 62. At step 62, the Δ Retard signal calculated at step 56 is compared to a second threshold value ($R_{THRESHOLD}$). If the Δ Retard value exceeds its threshold value $R_{THRESHOLD}$, step 62 branches to step 64 where the anti knock system 38 (FIG. 3) generates an output signal on line 42 to the spark advance control to increase the spark ignition retardation. Thereafter, step 64, or alternatively, step 62, branches back to step 50 where the above described process is continuously repeated.

EXAMPLE 1

An example will now be discussed utilizing the vibration frequency spectrum illustrated in FIG. 4(a), together with the decision table illustrated in FIG. 8. With the frequency spectrum of FIG. 8, both the ΔFuel and ΔRetard signals are determined in accordance with the previously described formulas:

$$\Delta Fuel = \Sigma W_{FUEL}(f) \times (SPECTRUM(f) - BGL(f))$$

$$\Delta Retard = \Sigma W_{RETARD}(f) \times (SPECTRUM(f) - BGL(f))$$

which generates the following values for the ΔFuel and ΔRetard:

ΔFuel = 14.9

ΔRetard = 13.9

Figure 8:
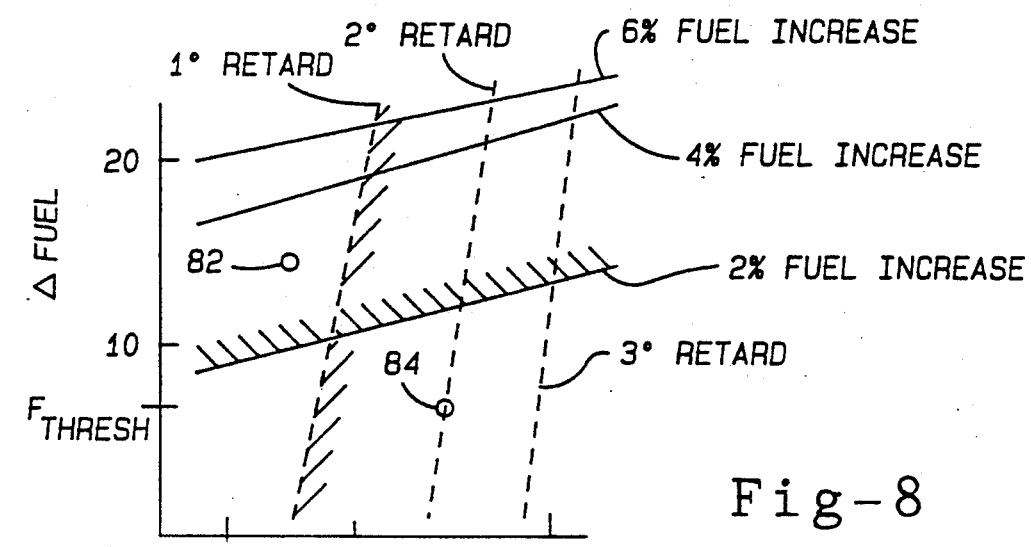
FIG. 8 is a decision graph used in conjunction with the preferred embodiment of the present invention.

Both the ΔFuel and ΔRetard are then Plotted on the decision table shown in FIG. 8 as Point 82. From the decision table (FIG. 8) it is clear that the single engine knocking condition illustrated in FIG. 4(a) can be corrected by increasing the fuel by 3%. At the same time, there is no adjustment in the spark ignition timing since the ΔRetard is less than the $R_{THRESHOLD}$ value illustrated in FIG. 8.

EXAMPLE 2

FIG. 4(b) represents the frequency spectrum of an engine undergoing multiple knocks caused primarily by high engine loads. In such a situation, the ΔFuel and ΔRetard values are calculated by the previously described formulas:

$$\Delta Fuel = \Sigma W_{FUEL}(f) \times (SPECTRUM(f) - BGL(f))$$

$$\Delta Retard = \Sigma W_{RETARD}(f) \times (SPECTRUM(f) - BGL(f))$$

which results in the following values for ΔFuel and ΔRetard:

ΔFuel = 8.5

ΔRetard = 31.5

The values for the ΔFuel and ΔRetard are then Plotted on the decision table of FIG. 8 as Point 84. From the decision table it is clear that the engine knocking can be corrected by retarding the spark ignition by 2. Simultaneously, there is no adjustment in the fuel rate since the value for the ΔFuel (8.5) is less than the threshold value illustrated in FIG. 8.

It will be understood, of course, that the decision table depicted in FIG. 8 may vary from one engine to the next. The precise decision table of FIG. 8 is determined empirically.

EXAMPLE 3

Resonant frequencies change according to engine speed, combustion temperature, engine load, engine deterioration, etc. In such real systems, it is necessary to estimate both ΔFuel and ΔRetard.

As shown in FIGS. 5 and 6, the common frequency area of weighting function $W_{FUEL}$ and $W_{RETARD}$ between 8–14 kHz can be determined. In this area, resonant vibration will appear based on the both of single knock and multiple simultaneous knock. The inclined lines of FIGS. 5 and 6 between 8–14 kHz represent the probability distribution of knock resonant vibrations occurring. Consequently, FIGS. 5 and 6 are easy and good weighting function for estimation of the knock vibration power even if resonant frequencies change. But there must be some cross-talk between ΔFuel and ΔRetard.

When resonant frequencies change, however, that probability distribution must also be changed. If we need to estimate the ΔFuel and ΔRetard without cross-talk, the weight factors of FIGS. 5 and 6 require steeper inclination such as FIGS. 9 and 10. However, by doing so, it is difficult to separate the vibration power between 8–14 kHz into the elements of single knock and multiple simultaneous knock. Thus, it is necessary to create an algorithm to clarify the splitting frequency which splits the vibration power spectrum into both areas to calculate ΔFuel and ΔRetard.

The split point of frequency fs is determined accordingly to these formulas:

$$fs = fF + (fR - fF) \times PowerF/(PowerR + PowerF)$$

$$\text{PowerF} = \sum_{f=4}^{fF} \{\text{SPECTRUM}(f) - BGL(f)\}$$

$$\text{PowerR} = \sum_{f=fR}^{19} \{\text{SPECTRUM}(f) - BGL(f)\}$$

(where, $fF$ is 8 and $fR$ is 14, for simplicity)

Figure 11:
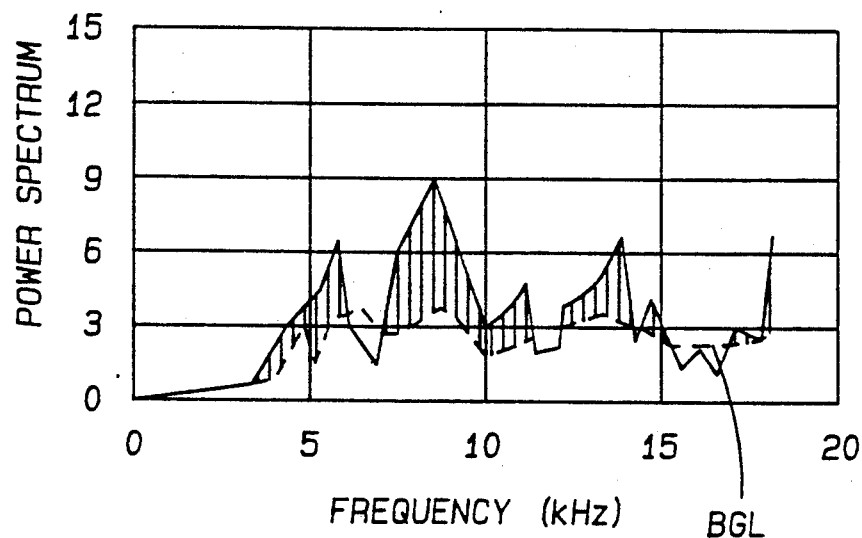
FIG. 11 is a graph illustrating the power spectrum for an engine undergoing single knock.

Because the items of resonant vibration power occurring between 8–14 kHz are proportional to the vibration powers of 4–8 kHz range and 14–19 kHz range as same as the momentum. In FIG. 11 with power spectrum caused by single knock is illustrated. Since the major portion of the power spectrum occurs between 4 kHz and 14 kHz, fs must be close to 14 kHz.

To calculate the relative control values of fuel increasing and ignition time retarding, the following formulas are needed:

$$\text{IntensityF} = \frac{\sum_{f=4}^{fs} W^*\text{FUEL}(f) \times \text{SPECTRUM}(f)}{\sum_{f=4}^{fs} W^*\text{FUEL}(f) \times BGL(f)}$$

$$\text{IntensityR} = \frac{\sum_{f=fs}^{19} W^*\text{RETARD}(f) \times \text{SPECTRUM}(f)}{\sum_{f=fs}^{19} W^*\text{RETARD}(f) \times BGL(f)}$$

where, W*FUEL(f) and W*RETARD(f) are weighting functions determined within 4–19 kHz range and separated at fs kHz.

Figure 9A:
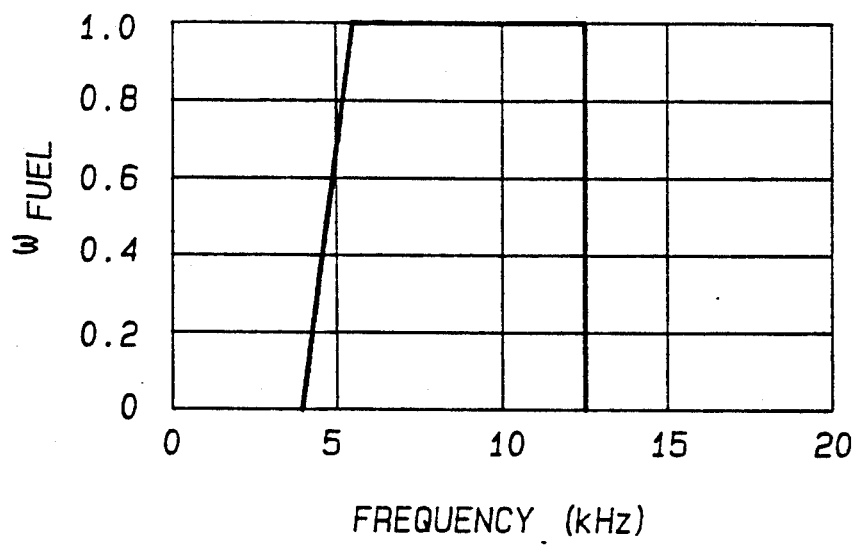
FIGS. 9(a) and 9(b) are graphs of weight factors similar to FIGS. 5 and 6, but illustrating a modification thereof.
Figure 9B:
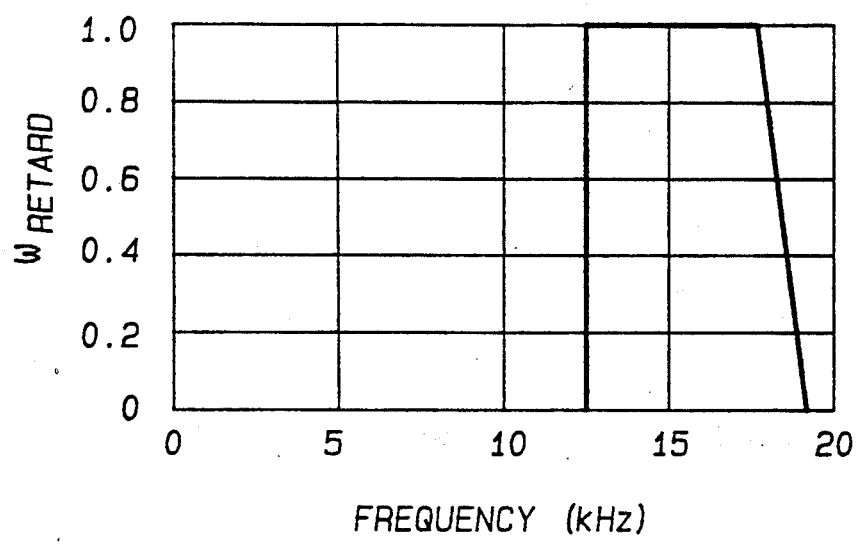

IntensityF and IntensityR are relative values to estimate the intensity of knock resonant vibration power compared with normal vibration power without knock. IntensityF is determined according to the ratio of vibration powers caused by simple knock which is weighted by W*FUEL(f) and summed up within 4−fs kHz range and the summation of also weighted normal vibration power within 4−fs kHz range. Similarly, IntensityR with respect to multiple simultaneous knock is determined using the weighting function W*RETARD(f) within fs−19 kHz range. FIGS. 9(a) and 9(b) show weighting function W*FUEL(f) and W*RETARD(f) respectively where, in this case, fs equal 12.2. These formulas generate the following values for the IntensityF and IntensityR:

IntensityF = 27.2/16.3 = 1.67

IntensityR = 19.4/17.3 = 1.12

Figure 13:
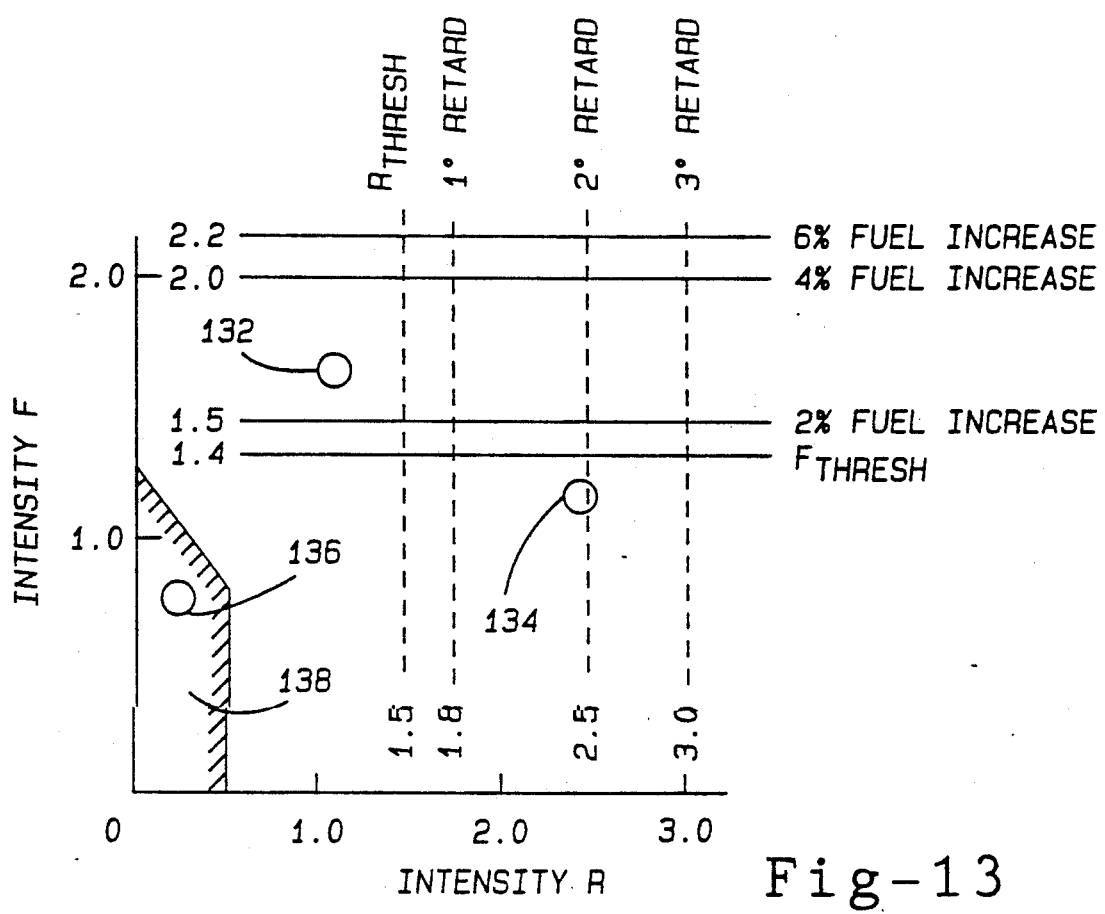
FIG. 13 is a decision table similar to FIG. 8, but illustrating a modification thereof.

Both IntensityF and IntensityR are plotted on the decision table shown in FIG. 13 as point 132. From the decision table it is clear that the simple knock condition can be corrected by increasing the fuel by 2.7%. At the same time, there is no adjustment in the spark ignition timing.

EXAMPLE 4

Figure 12:
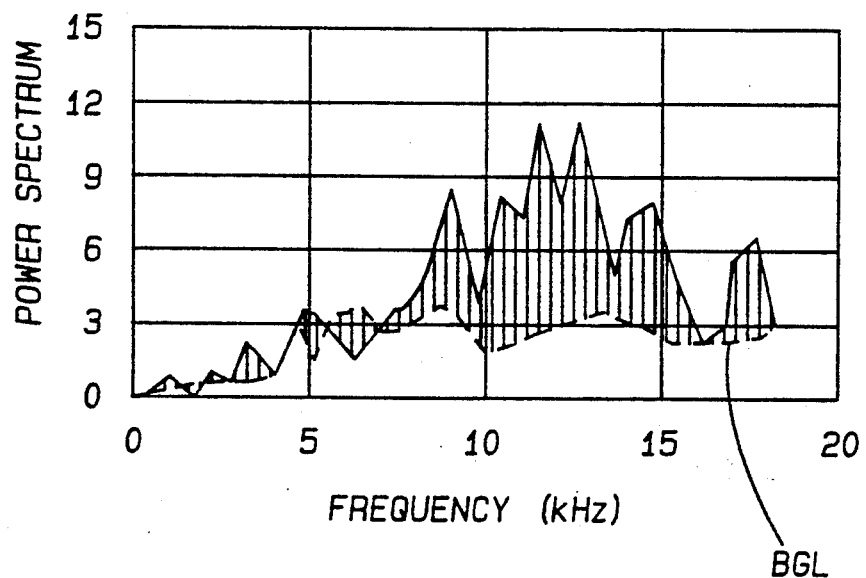
FIG. 12 is a graph illustrating the power spectrum for an engine undergoing multiple simultaneous knock.

The above described procedure for Example 3 can also be applied to an engine undergoing multiple simultaneous knocks. FIG. 12 illustrates the power spectrum of an engine undergoing multiple simultaneous knocks. Since the major portion of the power spectrum occurs between 8 kHz and 19 kHz, fs must be close to 8 kHz.

Figure 10A:
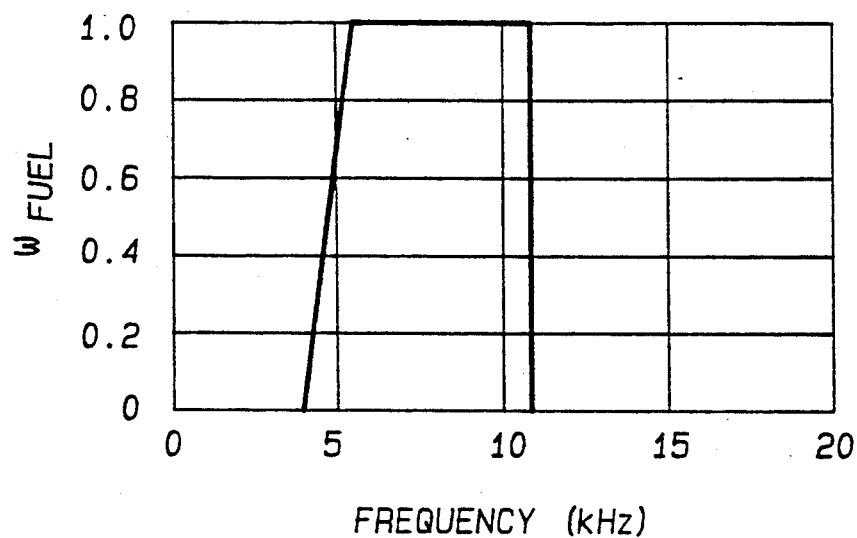
FIGS. 10(a) and 10(b) are graphs of weight factors for the engine power spectrums shown in FIGS. 11 and 12, respectively.
Figure 10B:
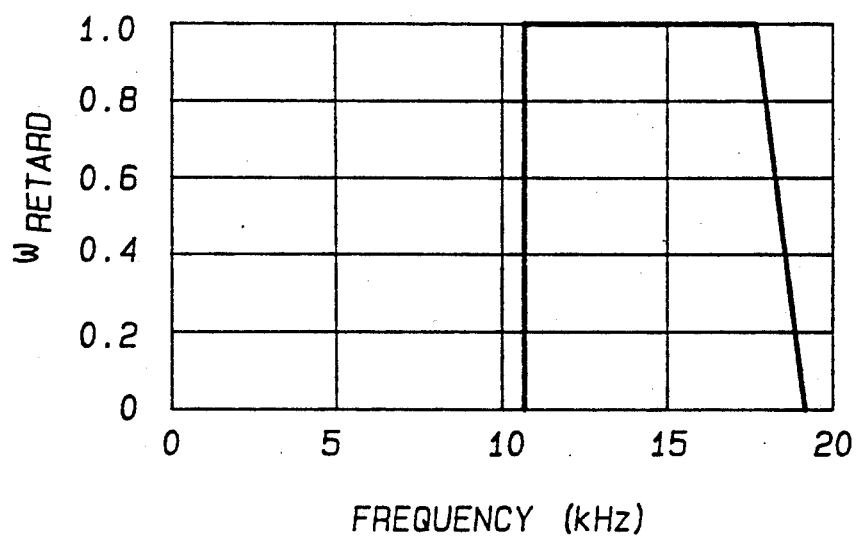

FIGS. 10(a) and 10(b) show weighting function W*FUEL(f) and W*RETARD(f) respectively where, in this case, fs equal 10.4. The following values for the IntensityF and IntensityR are then generated using the formulas previously described in Example 3:

IntensityF = 15 1/12.2 = 1.24

IntensityR = 52.9/21.4 = 2.47

Both IntensityF and IntensityR are then plotted on the decision table shown in FIG. 13 as point 134. From the decision table it is clear that the multiple simultaneous knock condition can be corrected by retarding the spark ignition timing by 2 degrees. At the same time, there is no adjustment in the fuel.

In lieu of the decision table illustrated in FIG. 13, an adaptive method can be used to determine ΔFuel and/or ΔRetard necessary to correct engine knock. Such a method requires only a few predetermined thresholds such as $F_{THRESH}$, 2,4,6% fuel increase, $R_{THRESH}$ and 1,2,3 degree retard which are shown in FIG. 13 to IntensityF and IntensityR. In this case, the following values for the thresholds which are described in FIG. 13 are used.

$F_{THRESH} = 1.4$ (2% fuel increase)2%FI = 1.5
(4% fuel increase)4%FI = 2.0
(6% fuel increase)6%FI = 2.2

$R_{THRESH} = 1.5$ (1 degree retard)1°R = 1.8
(2 degree retard)2°R = 2.5
(3 degree retard)3°R = 3.0

In above cases, the IntensityF and IntensityR are calculated according to thresholds using linear interpolation described below. It brings an adaptive strategy of the both of fuel injection and ignition timing control.

For Example 3:
Increasing the fuel
= 2% + (4% − 2%) ×
  (IntensityF − 2%FI)/(4%FI − 2%FI)
= 2 + (4 − 2) × (1.67 − 1.5)/(2.0 − 1.5)
= 2.7 [%]

For Example 4:
Retarding the ignition timing
= 1° + (2° − 1°) × (IntensityR − 1°R)/(2°R − 1°R)
= 1 + (2 − 1) × (2.47 − 1.8)/(2.5 − 1.8)
= 2.0 [degree]

EXAMPLE 5

Figure 14:
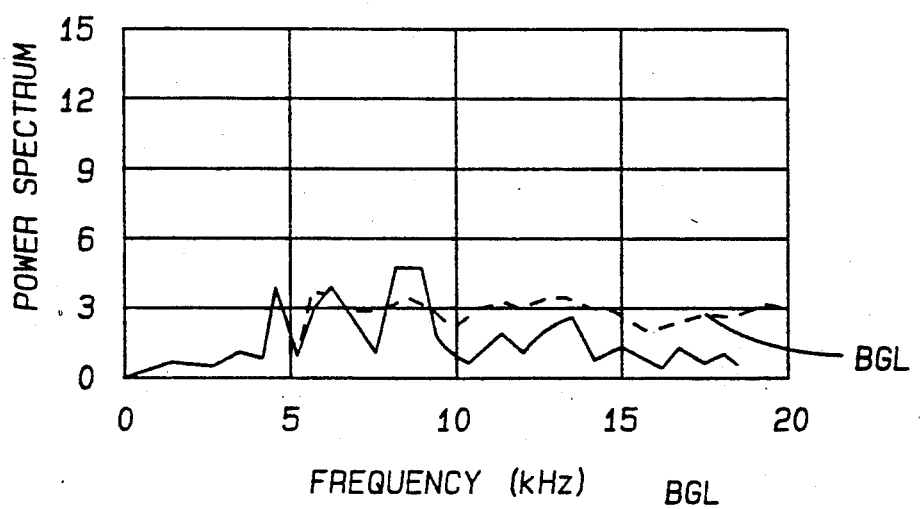
FIG. 14 is a graph illustrating the power spectrum for an engine undergoing misfires.

The above described procedures for EXAMPLE 3 and 4 can also be applied to an engine undergoing misfires. FIG. 14 illustrates the power spectrum of an engine undergoing misfires. When misfire occurs, the higher frequency portion of the frequency spectrum reduces in magnitude due to less mechanical noise under less cylinder pressure. Conversely, the lower frequency portion of the frequency spectrum does not get as small in magnitude because it includes much of the fundamental mechanical noises which occur every time the piston and crank move.

As shown in FIG. 14, since the major portion of the power spectrum occurs between 4 kHz and 9 kHz, fs must be 14 kHz exactly by applying the calculation for fs given in Example 3. The following value for the IntensityF and IntensityR are then generated using the formulas previously described in EXAMPLE 3:

IntensityF = 0.75

IntensityR = 0.21

Both IntensityF and IntensityR are then plotted on the decision table shown in FIG. 13 as point 136. The decision table includes a predetermined misfire region 138 and, since the point 136 falls within the misfire region 138, it is clear that a misfire is occurring.

From this misfire detection the controller determines not only whether the retarding the spark ignition timing and/or the increasing the fuel to correct knock conditions are exceeding to cause misfire or not, but also that abnormal combustion like a misfire occurs or not even if knock does not occur. Thus, this misfire detection works as a fail safe mechanism and brings more a robust knock control strategy.

From the foregoing, it can be seen that the present invention provides both an apparatus and a method for not only analyzing the particular knock occurring within the internal combustion engine, but also efficiently reducing or eliminating the knock by increasing the fuel and/or retarding the spark ignition for the engine as a result of the vibration frequency analysis.

Having described my invention, however, many modifications thereto will become apparent to those skilled in the art to which it pertains without deviation from the spirit of the invention as defined by the scope of the appended claims.

I claim:

1. An antiknock system for an internal combustion engine having a fuel system and a spark ignition system, said antiknock system comprising:
   means for detecting engine vibration and for generating a vibration output signal representative of the magnitude of the engine vibration over a predetermined frequency spectrum,
   means for integrating said vibration output signal over said frequency spectrum multiplied by a first weight factor to obtain a first value,
   means for integrating said vibration output signal over frequency spectrum multiplied by a second weight factor to obtain a second value,
   wherein said first weight factor has a greater average value in a first frequency range of said frequency spectrum than said second weight factor while said second weight factor has a greater average value in a second frequency range of said frequency spectrum than said first weight factor,
   means for comparing said first value with a first threshold value and generating a fuel control output signal when said first value exceeds said first threshold,
   means for comparing said second value with a second threshold value and generating a spark ignition control output signal when said second value exceeds said second threshold,
   means for varying the rate of fuel delivery by the fuel system as a function of said fuel control output signal, and
   means for varying ignition timing of the spark ignition system as a function of said spark ignition control output signal.

2. The invention as defined in claim 1 and further comprising means for subtracting a background vibration factor from said vibration output signal prior to integrating said vibration output signal over said frequency spectrum.

3. The invention as defined in claim 2 wherein said background vibration factor is indicative of engine vibration during a normal, no knock engine operation.

4. The invention as defined in claim 1 wherein said lower frequency range of said frequency spectrum extends from substantially five kHz to substantially 13 kHz.

5. The invention as defined in claim 1 wherein said higher frequency range of said frequency spectrum extends from substantially nine kHz to substantially 19 kHz.

6. The invention as defined in claim 1 wherein said means for generating an output signal representative of the magnitude of the engine vibration over a predetermined frequency spectrum comprises means for creating a fourier series representative of said vibration in said frequency spectrum.

7. The invention as defined in claim 1 and comprising means for adjusting the first and second weight factors as a function of engine vibration over said frequency spectrum.

8. The invention as defined in claim 1 wherein said first frequency range is lower in frequency than said second frequency range.

9. The invention as defined in claim 1 and comprising means for identifying engine misfire.

10. A method for reducing knock in an internal combustion engine having a fuel system and a spark ignition system, said method comprising the steps of:
    detecting engine vibration and generating a vibration output signal representative of the magnitude of the engine vibration over a predetermined frequency spectrum,
    integrating said vibration output signal over said frequency spectrum multiplied by a first weight factor to obtain a first value,
    integrating said vibration output signal over said frequency spectrum multiplied by a second weight factor to obtain a second value,
    wherein said first weight factor has a greater average value in a first frequency range of said frequency spectrum than said second weight factor while said second weight factor has a greater average value in a second frequency range of said frequency spectrum than said first weight factor,
    comparing said first value with a first threshold value and generating a fuel control output signal when said first value exceeds said first threshold,
    comparing said second value with a second threshold value and generating a spark ignition control output signal when said second value exceeds said second threshold,
    varying the rate of fuel delivery by the fuel system as a function of said fuel control output signal, and
    varying ignition timing of the spark ignition system as a function of said spark ignition control output signal.

11. The method as defined in claim 10 and further comprising the step of subtracting a background vibration factor from said vibration output signal prior to integrating said vibration output signal over said frequency spectrum.

12. The method as defined in claim 11 wherein said background vibration factor is indicative of engine vibration during a normal, no knock engine operation.

13. The method defined in claim 10 wherein said lower frequency range of said frequency spectrum extends from substantially five kHz to substantially 13 kHz.

14. The method defined in claim 10 wherein said higher frequency range of said frequency spectrum extends from substantially nine kHz to substantially 19 kHz.

15. The method defined in claim 10 wherein said generating an output signal representative of the magnitude of the engine vibration over a predetermined frequency spectrum step comprises the step of creating a fourier series representative of said vibration in said frequency spectrum.

16. The invention as defined in claim 10 and further comprising the step of varying the weight factors as a function of engine vibration over said frequency spectrum.

17. The invention as defined in claim 9 wherein said first frequency range is lower in frequency than said second frequency range.

18. The invention as defined in claim 10 and further comprising means for determining whether said first and second values fall within a region indicative of engine misfires, and means for generating an output signal representative thereof.

* * * * *